(12) United States Patent
Friend (10) Patent No.: US 6,494,639 B1
(45) Date of Patent: Dec. 17, 2002

(54) PRIMARY CONNECTOR FOR PRE-CAST STRUCTURES

(75) Inventor: Cliff Friend, Tampa, FL (US)

(73) Assignee: Universal Services, Inc., Tampa, FL (US)

( * ) Notice: Subject to any disclaimer, the term of this patent is extended or adjusted under 35 U.S.C. 154(b) by 0 days.

(21) Appl. No.: 09/301,682

(22) Filed: May 1, 1999

(51) Int. Cl.[7] .................................................. E04B 1/38
(52) U.S. Cl. ........................ 403/403; 403/205; 403/360; 403/387; 403/391; 52/293.3; 52/587.1; 52/285.1
(58) Field of Search ................................. 403/403, 205, 403/295, 336, 360, 363, 364, 381, 382, 387, 389, 391; 52/293.3, 293.2, 587.1, 582.1, 285.4, 285.1

(56) References Cited

U.S. PATENT DOCUMENTS

| | | | | |
|---|---|---|---|---|
| 757,986 A | * | 4/1904 | Weathered | 52/293.3 |
| 2,053,873 A | | 9/1936 | Niederhofer | 72/1 |
| 2,300,113 A | * | 10/1942 | Faber | 52/293.3 X |
| 2,633,610 A | | 4/1953 | Hervey | 20/2 |
| 3,199,477 A | | 8/1965 | Marsh, Jr. | 110/99 |
| 4,021,991 A | * | 5/1977 | Hotz | 403/387 X |
| 4,053,245 A | * | 10/1977 | Wright | 403/403 X |
| 4,905,334 A | | 3/1990 | Oppenhuizen | 52/511 |
| 5,211,502 A | * | 5/1993 | Upham-Hill | 403/389 X |
| 5,513,476 A | * | 5/1996 | Jones | 52/293.3 X |
| 5,611,179 A | * | 3/1997 | Leek | 52/293.3 |
| 5,758,988 A | | 6/1998 | Theodorou | 403/331 |
| 5,809,712 A | | 9/1998 | Simanjuntak | 52/223.7 |
| 5,846,018 A | * | 12/1998 | Frobosilo et al. | 403/403 |
| 5,881,519 A | * | 3/1999 | Newkirk | 52/582.1 X |

* cited by examiner

Primary Examiner—Lynne H. Browne
Assistant Examiner—David E. Bochna
(74) Attorney, Agent, or Firm—Pettis & Van Royen, PA (57) ABSTRACT

A primary connector useful for attaching a pre-cast element to a structure includes a receiver member and an attachment member. The receiver member includes a base plate and an acceptor disposed in substantially normal relation to the base plate. The attachment member is a separate plate having a front surface and a back surface with a plurality of anchors extending outwardly from the back surface and a plurality of keyhole slots formed through the plate with each of the slots be accessible from the plate's front surface so that the attachment member may be joined to the receiver member.

8 Claims, 8 Drawing Sheets

FIG. 6
TOP VIEW

FIG. 7
BOTTOM VIEW

PRIMARY CONNECTOR FOR PRE-CAST STRUCTURES

BACKGROUND OF THE INVENTION

1. Field of the Invention

The present invention is a primary connector of the type primarily used for attaching a pre-cast element to a structure, More particularly, the primary connector of this invention is primarily intended for use in attaching a pre-cast element such as, for example, an outside wall, to a floor, particularly in high rise construction.

2. Description of the Prior Art

Numerous connectors and connector devices are well known in the prior art for use in building constructions. For example, U.S. Pat. No. 5,809,712 discloses a system and method for joining pre-cast concrete columns to slabs. A much older patent, U.S. Pat. No. 2,053,873, discloses improved means for connecting together building slabs or units in the construction of sides, walls, floors and roofs of buildings wherein one or more of the structural elements are pre-cast from cementitious materials. In U.S. Pat. No. 2,633,610, a prefabricated building is disclosed wherein hook and eye-type connecting means are used to joint together the individual elements of the prefabricated house. Interlocking refractory bricks having at least two functional sides for interlocking connection with corresponding sides of an adjacent brick are disclosed in U.S. Pat. No. 3,199,477. Other hook and eye-type connectors are disclosed in U.S. Pat. No. 4,905,334 and U.S. Pat. No. 5,758,988.

It is, therefore, clear that numerous means are old and well known in the prior art for structurally connecting building components. Nevertheless, quickly and efficiently attaching large pre-cast structures, such as walls, to the outside edge of floors in high rise construction remains an elusive goal. According to typical construction techniques used today, when the wall is flown into position, its primary connection to the building's floor slab is by welding adjacent metal plates which have been embedded into the wall and floor, respectively, a time-consuming and expensive task.

It is, therefore, clear that an improved primary connector for attaching structures such as outside walls to floors without the necessity of welding when making the primary connection is needed.

SUMMARY OF THE INVENTION

The present invention relates to a primary connector of the type primarily used for attaching a pre-cast element such as, for example, an exterior wall panel to a structure such as, for example, a floor. The primary connector of this invention comprises a receiver member which is attachable to the structure and an attachment member which is cast in place in the pre-cast element. The receiver member comprises a base plate and an acceptor disposed in substantially normal relation to the base plate. The attachment member comprises a plate have a front surface and a back surface, with a plurality of anchors extending outwardly from the back surface and a plurality of keyhole slots formed through the plate, each of those slots being accessible from the front surface.

According to a first preferred embodiment, the acceptor comprises a second plate joined to a front edge of the base plate and extending upwardly from the base plate top surface. The acceptor of this first preferred embodiment further comprises a plurality of pins extending from the second plate in substantially parallel relation to the base plate top surface and outwardly from the front edge of the base plate. The keyhole slots formed through the attachment member are dimensioned and configured to receive and retain a corresponding one of the pins therein, whereby the attachment member may be joined to the receiver member and held therein by gravity.

According to a second preferred embodiment, the acceptor comprises a plurality of spaced apart webs wherein each of the webs have a bottom edge and a front edge. The web front edge extends in substantially normal relation to the bottom edge, and the web bottom edges are joined to the base plate top surface such that the web front edges are aligned with the front edge of the base plate. In this second preferred embodiment, each of the web front edges further comprises at least one finger extending outwardly therefrom, and each of the fingers further comprises a hook formed thereon distal from the web front edge. Each of these hooks extends upwardly away from the base plate top surface. Each of the keyhole slots in this second preferred embodiment is dimensioned and configured to receive and retain a corresponding one of the fingers therein., whereby the attachment member of this second preferred embodiment may be joined to the receiver member of this second preferred embodiment.

With particular regard to the drawing figures and the ensuing detailed description of the first and second preferred embodiments of this invention, it is to be understood that to reverse the placement of the pins and keyhole slots of the first embodiment, or the fingers and keyhole slots of the second embodiment, is deemed to be an obvious variation of the invention described and claimed herein, and such modifications would fall within the scope of the claimed invention.

The invention accordingly comprises an article of manufacture possessing the features, properties, and the relation of elements which will be exemplified in the articles hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

A first preferred embodiment of the primary connector of this invention is generally indicated as 20 in the views of FIGS. 1–7. Referring first to the exploded view of FIG. 2, it can be seen that this embodiment of the primary connector 20 comprises a receiver member generally indicated as 22 and attachment member generally indicated as 24.

Figure 2:
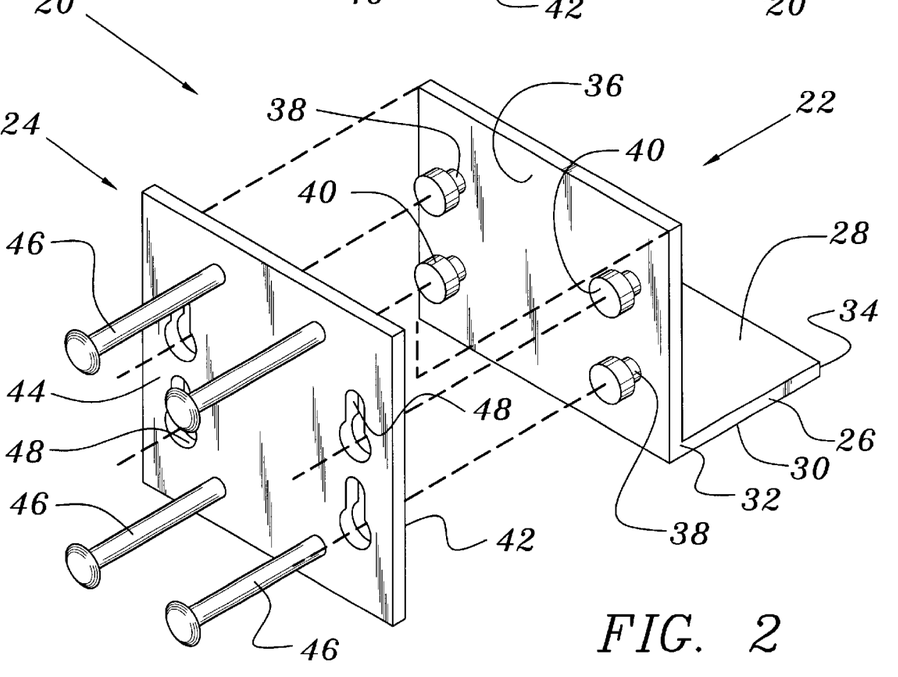
FIG. 2 is an exploded view of the primary connector shown in FIG. 1.

Receiver member 22 comprises a base plate 26 including a top surface 28, a bottom surface 30, a front edge 32, and a back edge 34.

The receiver member 22 further comprises an acceptor which is defined by a second plate 36 which is joined to front edge 32 and extends upwardly from top surface 28 in substantially normal relation thereto.

The acceptor defined by second plate 36 further comprises a plurality of pins extending from second plate 36 in substantially parallel relation to top surface 28 and outwardly from front edge 32. As clearly seen in the view of FIG. 2, each one of the plurality of pins comprises a body 38 and an enlarged head 40 formed on body 38 distal from second plate 36.

Figure 1:
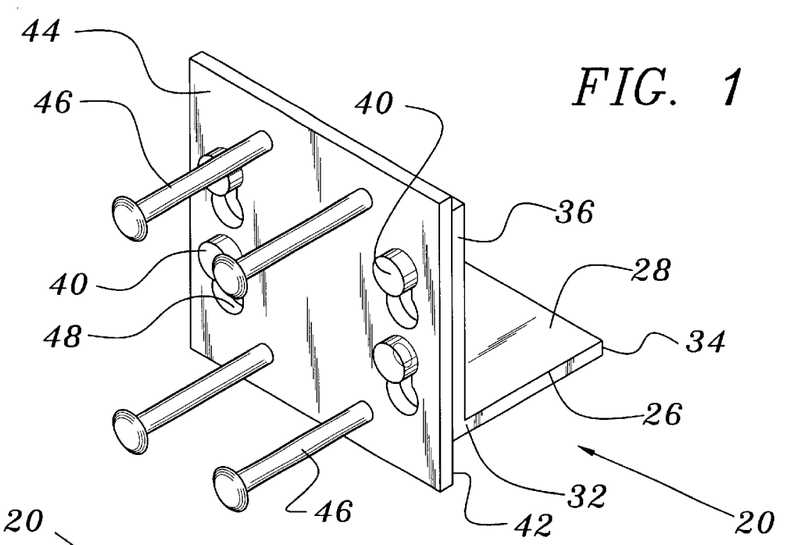
FIG. 1 is a perspective view of the first preferred embodiment of the primary connector of this invention.

Still with regard to the exploded view of FIG. 2, attachment member 24 is defined by a plate including a front surface 42, a back surface 44, a plurality of anchors 46 extending outwardly from back surface 44, and a plurality of keyhole slots 48 formed through the plate, each of the keyhole slots 48 being accessible from front surface 42 whereby the attachment member 24 may be joined to the receiver member 22, as shown in the view of FIG. 1.

Figure 3:
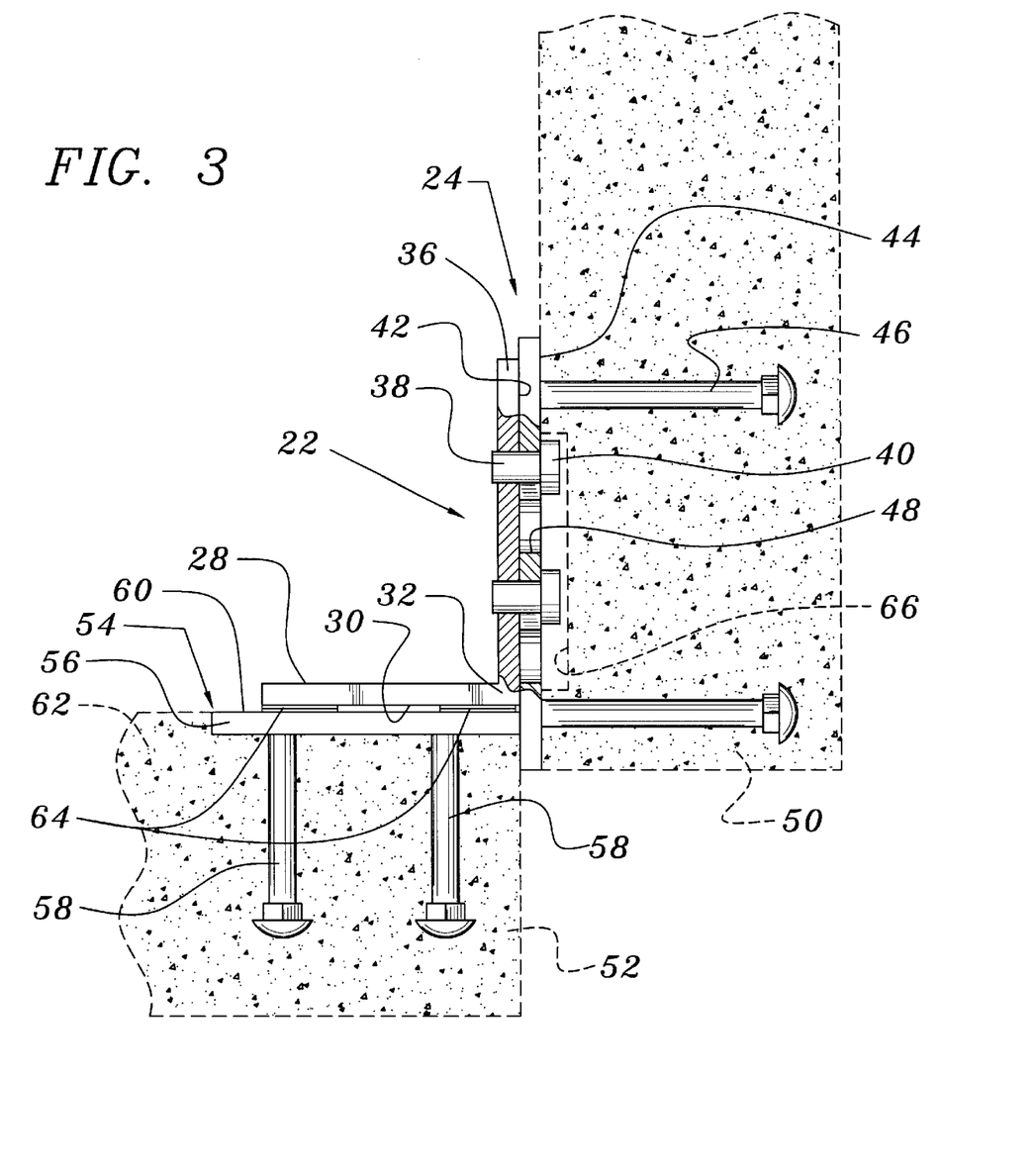
FIG. 3 is a side sectional view showing the primary connector of FIG. 1 in use.
Figure 4:
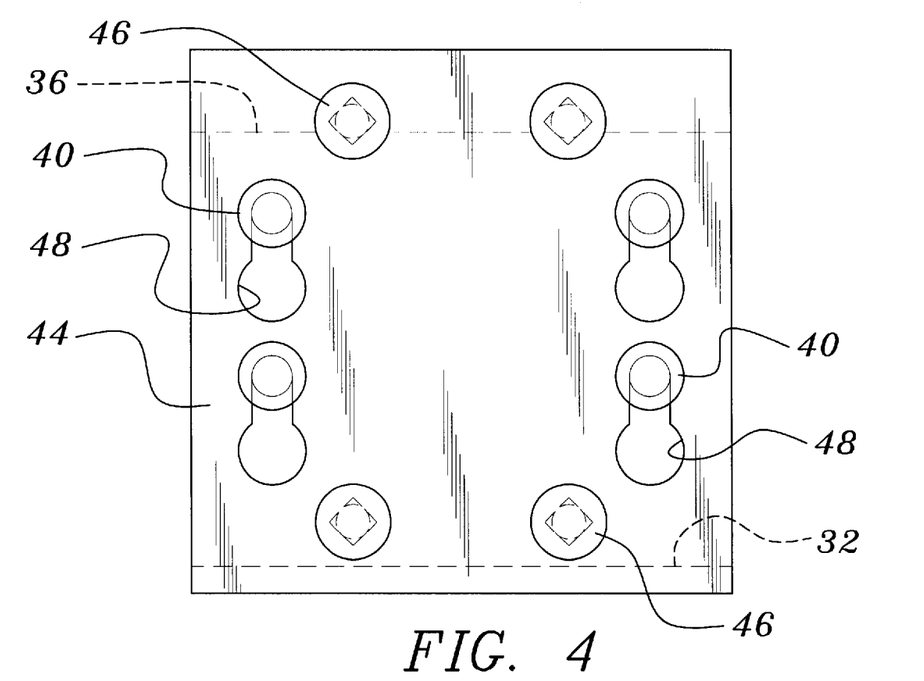
FIG. 4 is a front elevation of the primary connector shown in FIG. 1.
Figure 5:
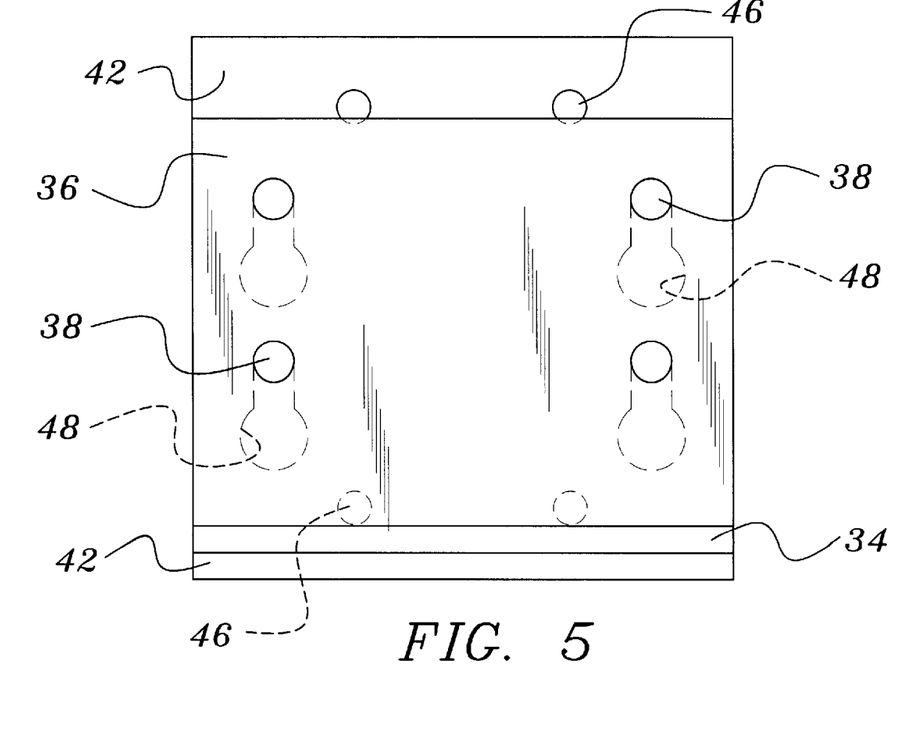
FIG. 5 is a rear elevation of the primary connector shown in FIG. 1.
Figure 6:
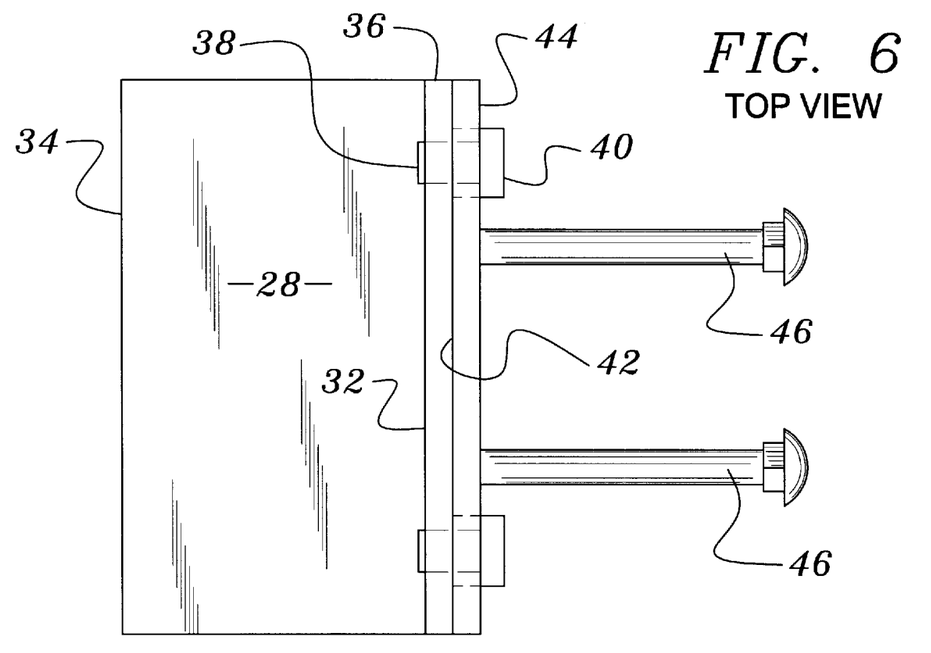
FIG. 6 is a top view of the primary connector shown in FIG. 4.
Figure 7:
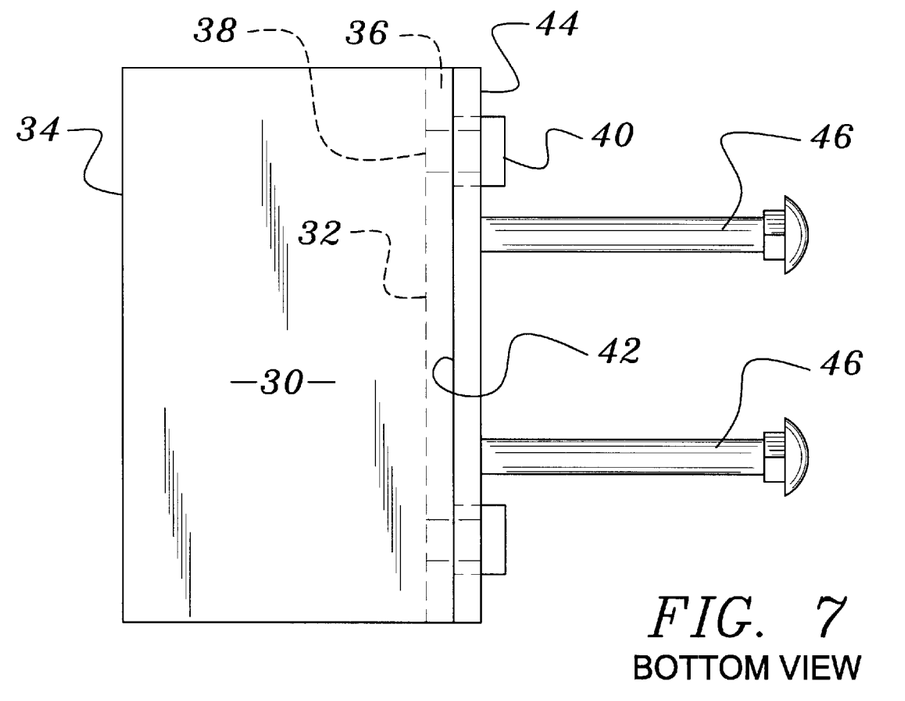
FIG. 7 is a bottom view of the primary connector shown in FIG. 4.

Attention is now invited to the view of FIG. 3 wherein a typical illustration depicting actual use of first preferred embodiment 20 is shown. In the view of FIG. 3, the pre-cast element is depicted in section as a segment of concrete wall 50. The structure to which wall 50 is being attached is similarly shown as a concrete floor 52. Elements of the first preferred embodiment of primary connector 20 are, of course, identified by reference numerals previously defined. However, one can see that a secondary connector, generally indicated as 54, was embedded in floor 52 when it was originally formed. The secondary connector 54 is well known in the prior art and may comprise a variety of constructions other than the exemplar construction shown in the view of FIG. 3. As shown in FIG. 3, secondary connector 54 comprises a plate 56 that is embedded in floor 52 and mechanically held therein by secondary anchors 58 so that top surface 60 of plate 56 is exposed and substantially coplanar with top 62 of floor 52.

Base plate 26 is fixedly attached to top surface 60 of plate 56 as by welding, indicated by reference numeral 64. It is to be understood that any suitable means for structurally attaching base plate 26 to secondary connector 54 may be used inasmuch as this connection is not a limiting factor on the scope of the present invention.

Still with reference to the view of FIG. 3, one can see that attachment member 24 is cast into wall 50 when wall 50 is formed. It is also to be noted that a recess 66 is provided in wall 50 in substantially surrounding relation to keyhole slots 48, so as to permit the passage of enlarged heads 40 and bodies 38 therethrough. Once installed as shown in the view of FIG. 3, the primary connection between wall 50 and floor 52 is accomplished and maintained by the weight of wall 50. Then, using well known construction techniques, final attachment is completed.

Figure 8:
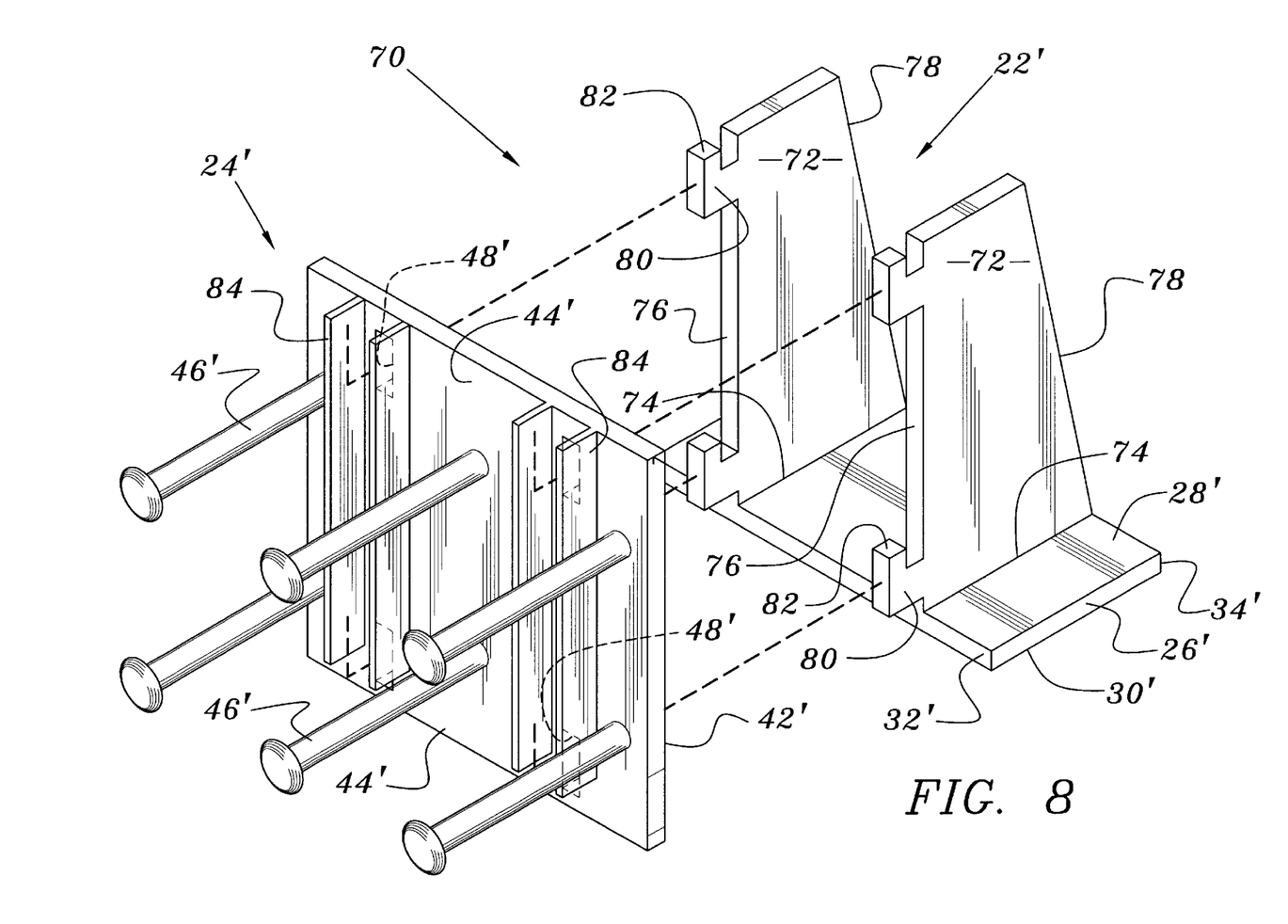
FIG. 8 is an exploded view of the second preferred embodiment of the primary connector, similar to the view of FIG. 2.

Attention is now invited to the views of FIGS. 8–11 where a second preferred embodiment of the primary connector of this invention is generally indicated as 70. Structural details of this second preferred embodiment 70 which are the same as previously identified with regard to first preferred embodiment 20 have been identified by like reference numerals with the addition of a prime (') mark to the reference numeral. FIG. 8 clearly shows that second preferred embodiment 70 comprises a receiver member generally indicated as 22' and an attachment member generally indicated as 24'. The receiver member 22' includes a base plate 26' having a top surface 28', a bottom surface 30', a front edge 32', and a back edge 34'.

Receiver member 22' further comprises an acceptor defined by a plurality of spaced apart webs 72, each of the webs 72 having a web bottom edge 74 and a web front edge 76, front edge 76 extending in substantially normal relation to bottom edge 74. Web bottom edge 74 is joined to base plate top surface 28' such that web front edge 76 is aligned with front edge 32' of base plate 26'. In the view of FIG. 8, it can also be seen that each of the webs 72 includes an inclined web back edge 78.

Still with regard to the exploded view of FIG. 8, it can be seen that each of the spaced apart webs 72 further comprise at least one finger 80 extending outwardly from web front edge 76, with each of the fingers 80 further comprising a hook 82 formed thereon distal from web front edge 74 and extending upwardly away from base plate top surface 28'.

Figure 9:
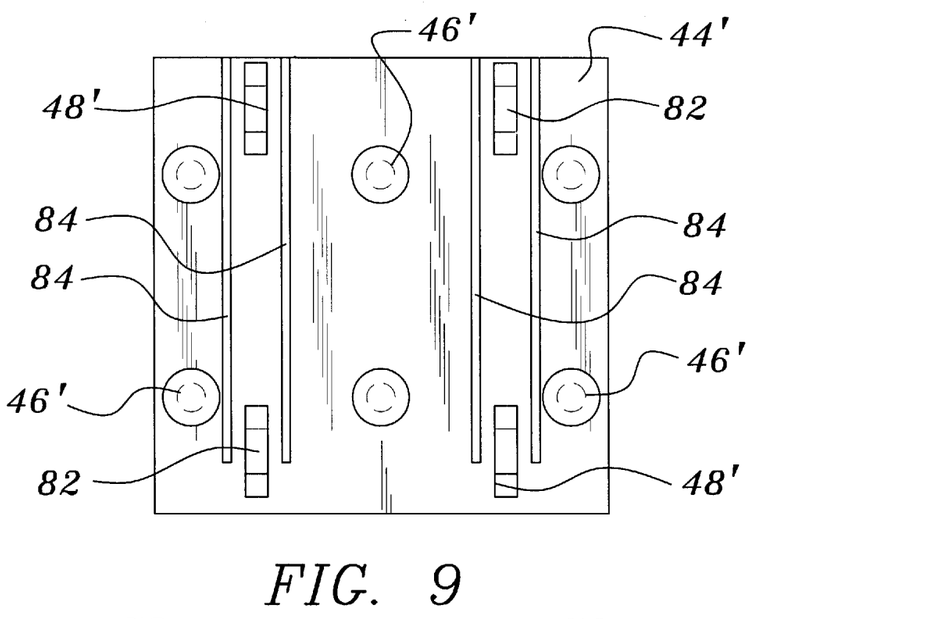
FIG. 9 is a front elevation of the primary connector of FIG. 8, similar to the view of FIG. 4.
Figure 10:
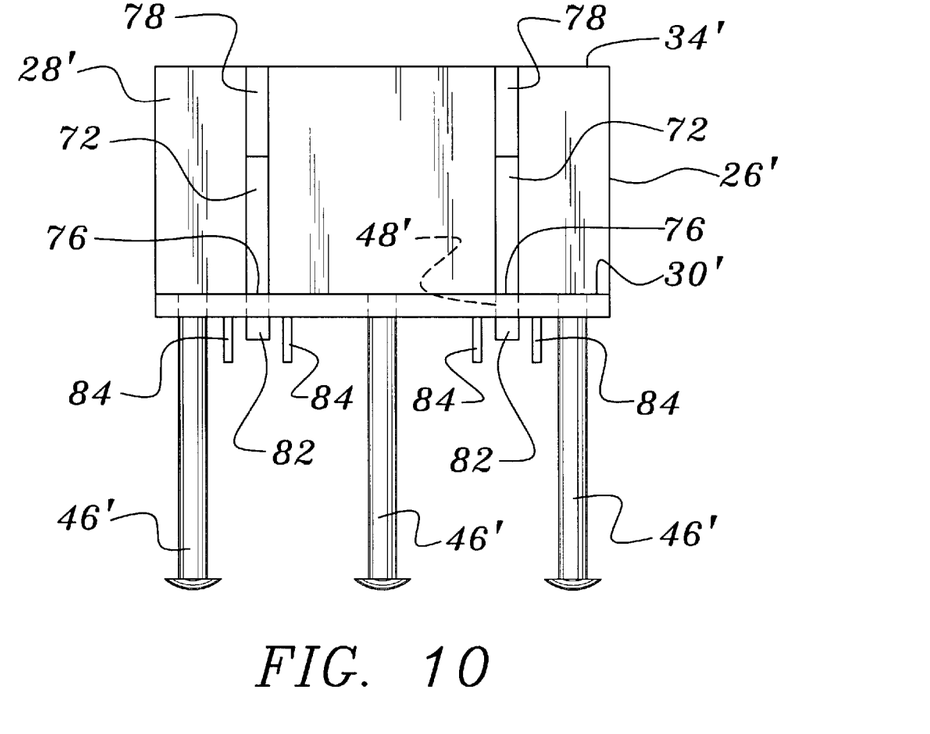
FIG. 10 is a top view of the primary connector of FIG. 8, similar to the view of FIG. 6.
Figure 11:
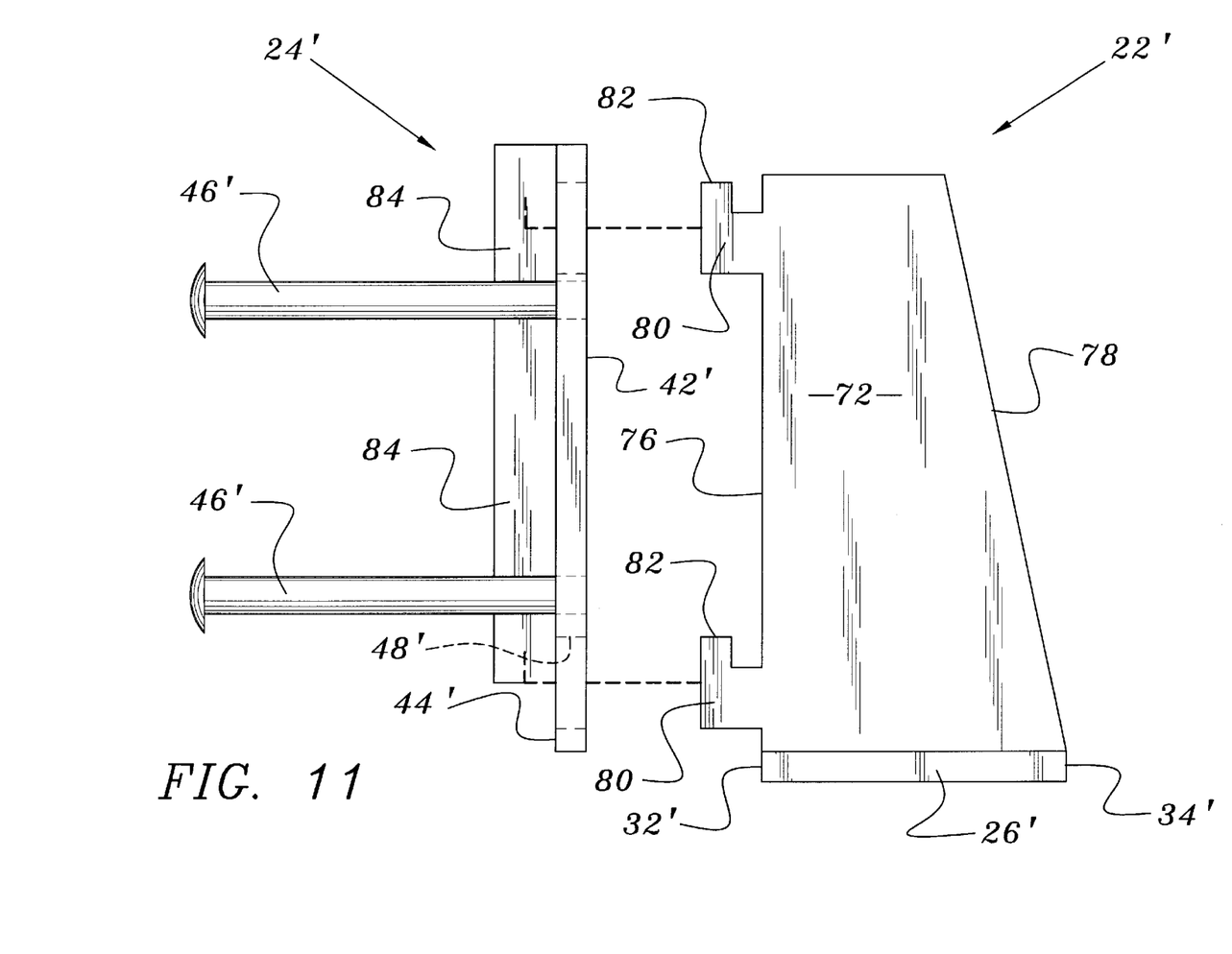
FIG. 11 is a side view of the primary connector of FIG. 8.

The attachment member 24' is defined by an attachment plate having a front surface 42', a back surface 44', a plurality of anchors 46' extending outwardly from back surface 44', and a plurality of keyhole slots 48' formed through the plate, each of the keyhole slots 48' being accessible from front surface 42' whereby the attachment member 24' may be joined to the receiver member 22' as shown in the views of FIGS. 9 and 10.

Attachment member 24' further comprises a plurality of reinforcing webs 84 attached to back surface 44' and extending outwardly from back surface 44'. In this preferred construction, one if the reinforcing webs 84 is on each side of each one of the keyhole slots 48', as clearly seen in the views of FIGS. 8–10.

A typical installation utilizing second preferred embodiment 70 would be substantially identical to that illustrated with regard to first preferred embodiment 20 on the view of FIG. 3. Base plate 26' would be attached to a secondary connector as by welding or other suitable fastening, and attachment member 24' would be cast into a corresponding wall 50 when that wall 50 was formed. Thus, regardless of whether a construction corresponding to first preferred embodiment 20 or second preferred embodiment 70 is utilized, the primary connector of this invention provides both efficient and safe means for establishing a primary connection between a pre-cast element and a structure to which that element is being fixed.

Figures 12, 13:
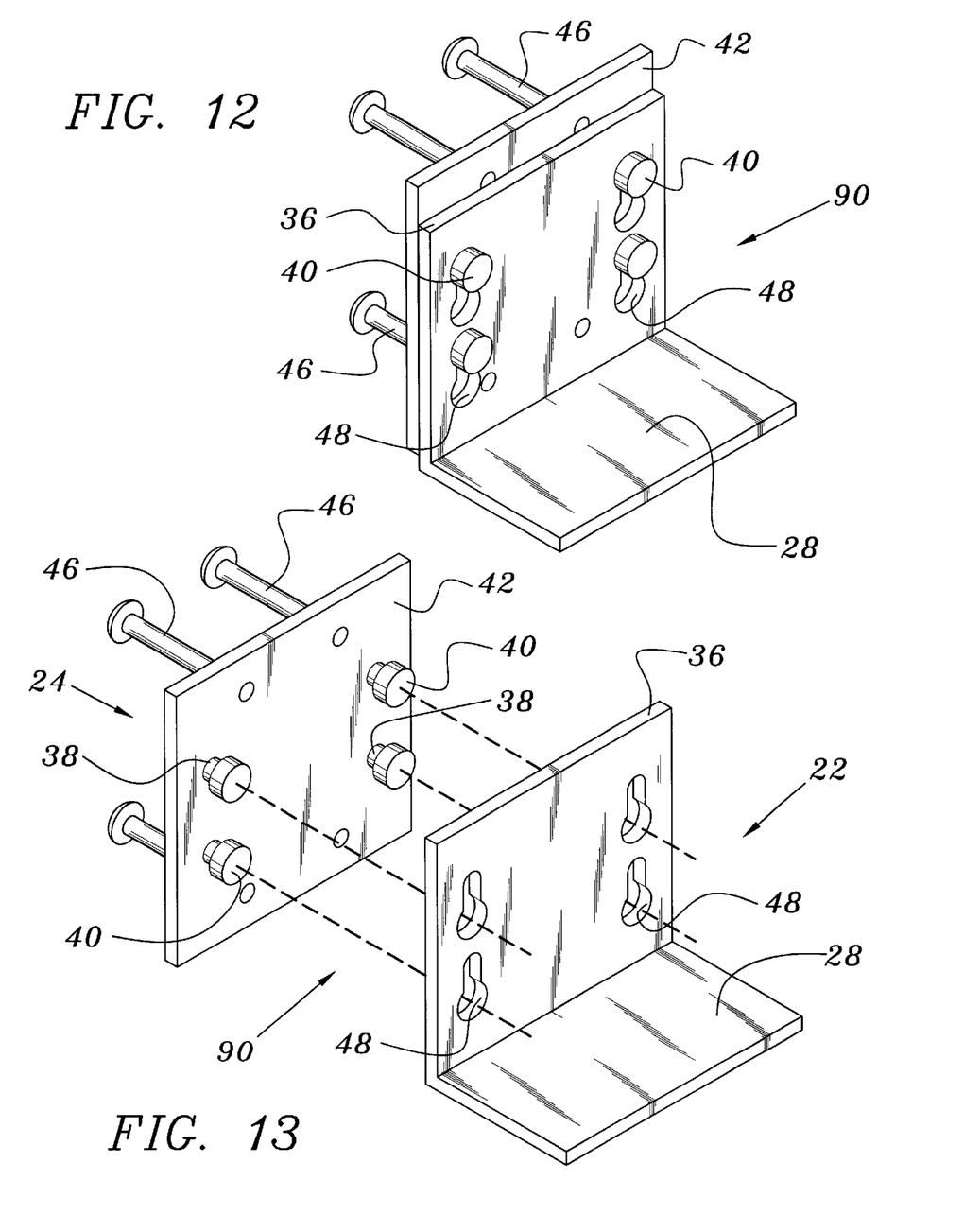
FIG. 12 is a perspective view, similar to that of FIG. 1, showing reversal of the keyhole slots and pins.
FIG. 13 is an exploded view of the primary connector shown in FIG. 12.

Referring, finally, to the views of FIGS. 12 and 13, one sees a third preferred embodiment generally indicated as 90 that is almost identical to first preferred embodiment 20. However, as previously explained in the Summary of the Invention, pins defined by body 38 and enlarged head 40 have now been placed on front surface 42 of attachment member 24, and keyhole slots 48 have been formed through second plate 36 of receiver member 22. Installation and use of this third preferred embodiment 90 is essentially as described above with regard to first preferred embodiment 20.

It will thus be seen that the objects set forth above, among those made apparent from the preceding description, are efficiently attained, and since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
what is claimed is:

1. A primary connector of the type primarily used for attaching a pre-cast element to a structure, said primary connector comprising: a receiver member and an attachment member; said receiver member comprising a base plate comprising a top surface and a bottom surface and a front edge and a back edge, and an acceptor disposed in substantially normal relation to said base plate; said attachment member comprising a plate including a front surface and a back surface, a plurality of anchors extending outwardly from said back surface and a plurality of keyhole slots formed through said plate, each of said slots being accessible from said front surface; said acceptor comprising a plurality of spaced apart webs, each of said webs having a bottom edge and a front edge extending in substantially normal relation to said bottom edge, said web bottom edges being joined to said base plate top surface such that said web front edges are aligned with said base plate front edge, whereby said attachment member may be joined to said receiver member.

2. A primary connector as in claim 1 wherein each of said web front edges further comprises at least one finger extending outwardly therefrom, each of said fingers comprising a hook formed thereon distal from said web front edge, each one of said hooks extending upwardly away from said base plate top surface.

3. A primary connector as an claim 2 wherein each one of said keyhole slots is dimensioned and configured to receive and retain a corresponding one of said fingers therein, whereby said attachment member may be joined to said receiver member.

4. A primary connector as in claim 3 wherein said attachment member further comprises a plurality of reinforcing webs attached to said back surface and extending outwardly from said back surface.

5. A primary connector as in claim 4 wherein one of said reinforcing webs is on each side of each one of said keyhole slots.

6. A primary connector used for attaching a pre-cast element to a structure having a secondary connector attached thereto, said primary connector comprising: a receiver member and an attachment member; said receiver member comprising a base plate comprising a top surface and a bottom surface and a front edge and a back edge and an acceptor disposed in substantially normal relation to said base plate; said attachment member comprising a plate including a front surface and a back surface, a plurality of anchors extending outwardly from said back surface and a plurality of keyhole slots formed through said plate, each of said slots being accessible from said front surface; said acceptor of said receiver member comprising a second plate joined to said front edge and extending upwardly from said top surface and a plurality of pins fixed to said second plate and extending from said second plate in substantially parallel relation to said top surface and outwardly from said front edge, each of said pins comprising a body and an enlarged head formed on said body distal from said second plate, said plurality of anchors being embedded in said pre-cast element and said base plate being attached to said secondary connector of said structure, whereby said attachment member may be joined to said receiver member by inserting each of said pins through a corresponding one of said keyhole slots to thereby attach said pre-cast element to said structure.

7. A primary connector as in claim 6 wherein each one of said keyhole slots is dimensioned and configured to receive and retain a corresponding one of said pins therein, whereby said attachment member may be joined to said receiver member.

8. A primary connector used for attaching a pre-cast element to a structure having a secondary connector attached thereto, said primary connector comprising: a receiver member and an attachment member; said receiver member comprising a base plate and an acceptor disposed in substantially normal relation to said base plate; said attachment member comprising a plate including a front surface and a back surface, a plurality of anchors extending outwardly from said back surface and a plurality of pins fixed to said plate and extending outwardly from said front surface, each of said pins comprising a body and an enlarged head formed on said body distal from said front surface, and a plurality of keyhole slots formed through said acceptor, each one of said slots being dimensioned and configured to receive a corresponding one of said pins therethrough, said plurality of anchors being embedded in said pre-cast element and said base plate being attached to said secondary connector of said structure, whereby said attachment member may be joined to said receiver member to thereby attach said pre-cast element to said structure.

\* \* \* \* \*